United States Patent [19]
Okorodudu

[11] Patent Number: 4,867,893
[45] Date of Patent: Sep. 19, 1989

[54] REACTION PRODUCTS OF N,N-DIORGANODITHIOCARBAMATES WITH THIONYL CHLORIDE AND LUBRICANT COMPOSITIONS CONTAINING SAME

[75] Inventor: Abraham O. M. Okorodudu, West Deptford, N.J.

[73] Assignee: Mobil Oil Corporation, New York, N.Y.

[21] Appl. No.: 236,406

[22] Filed: Aug. 24, 1988

[51] Int. Cl.$^4$ ............... C10M 135/18; C10M 135/08
[52] U.S. Cl. ................................. 252/47.5; 546/189; 564/76
[58] Field of Search ............... 252/47.5; 506/302, 310; 546/189

[56] References Cited

U.S. PATENT DOCUMENTS 4,175,194 11/1979 Nash ..................................... 546/189
4,501,678 2/1985 Katayama et al. ................. 252/47.5

OTHER PUBLICATIONS

Chemical Abstracts (59) 6935b, Ihara Agricultural Chemical Co., Japan, 1394 ('63).

*Primary Examiner*—William R. Dixon, Jr.
*Assistant Examiner*—Jerry D. Johnson
*Attorney, Agent, or Firm*—Alexander J. McKillop; Charles J. Speciale

[57] ABSTRACT

Disclosed are products derived from the reaction of amine or metal salts of N,N-diorganodithiocarbamic acids with thionyl chloride, $SOCl_2$. These compositions are useful as antioxidants and antiwear additives in lubricating oil compositions.

11 Claims, No Drawings

REACTION PRODUCTS OF N,N-DIORGANODITHIOCARBAMATES WITH THIONYL CHLORIDE AND LUBRICANT COMPOSITIONS CONTAINING SAME

FIELD OF THE INVENTION

This invention relates to the novel compounds resulting when thionyl chloride is reacted with the amine or metal salts of N,N-diorganodithiocarbamic acids. In another aspect this invention relates to lubricant comositions containing these compounds.

DISCUSSION OF THE PRIOR ART

Metal salts of dithiocarbamic acid have been known as additives for lubricating oils. U.S. Pat. No. 4,226,733 discloses the use of nickel alkyldithiocarbamates as additives to prevent ultra-violet degradation of lube oils. U.S. Pat. No. 4,428,861 discloses sulfidation reactions of dialkyl dithiocarbamates.

SUMMARY OF THE INVENTION

In one aspect this invention comprises the reaction product resulting from the reaction of a thionyl chloride and a metal or amine N,N-diorganodithiocarbamate salt. In another aspect this invention comprises the lubricant composition containing the afore-described reaction product and a lubricating oil.

DESCRIPTION OF THE INVENTION

Representative of the amine or metal dithiocarbamate salts are those having the following structure

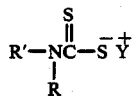

where R and R' are the same or different. R and R' are each a hydrocarbyl group containing from 1 to 36 carbon atoms, having none or at least one heteroatom which can be oxygen, sulfur, or nitrogen. R and R' are selected from alkyl, alkenyl, aryl, aralkyl, alkaryl groups and can contain phenyl, naphthyl, or anthryl substituents; R and R' can be a $(CH_n)_m$ group comprising part of an alicyclic or heterocyclic system selected from, for example, pyrrole, pyrrolidine, piperidine, morpholine etc. where n is 1 or 2 and m is 2 to 8. Y is an ammonium or metal radical.

A preferred dithiocarbamate salt is the triethylammonium salt of N,N-di-cocoamine-dithiocarbamic acid. This salt is prepared by reacting di-cocoamine and carbon disulfide in the presence of triethylamine in a suitable carrier solvent. Other preferred metal or amine salts include the amine or metal salts of other diorganodithiocarbamic acids derived from other secondary amines, for example, dialkyl, aryl alkyl, diaryl, dialkylaryl, diarylalkyl, alkyl arylalkyl, arylalicyclic, or heterocyclic amines, reacted in the presence of suitable aprotic solvents such as toluene, benzene or hexane. Other suitable metals salts include the sodium or potassium salts of N,N-diorganodithiocarbamates prepared by reacting a secondary amine with carbon disulfide in the presence of sodium, or potassium hydroxide in toluene.

The thionyl chloride and the ammonium or metal dithiocarbamate salt are reacted in a molar ratio of 1 mole of thionyl chloride to 2 moles of dithiocarbamate salt preferably at a temperature between 0° and 120° C. and a pressure of atmospheric to 100 psig for a period of 1 to 6 hours. The reaction product thus obtained is purified by filtering, washing and stripping and is then suitable for use as an additive in a lubricating oil.

Although I do not wish to be bound by the following structural formula, the resulting product is thought to have the following structure:

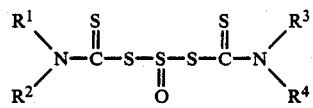

where $R^1$, $R^2$ and $R^3$, $R^4$ may be the same or different and each corresponds in description to the previous description of R and R'.

The lubricant compositions hereof may comprise any oleaginous materials that require lubricative properties under extreme pressure conditions and require protection against deterioration by oxidation or by excessive wear under operating conditions. Specially suitable for use with the additives of this invention are liquid hydrocarbon oils of any suitable lubricating viscosity. In general, the lubricant compositions may comprise any mineral or synthetic oil of lubricating viscosity or mixtures thereof. The additives of this invention are especially useful in automotive engine oils, marine diesel oils, aviation lubricants, greases, and in automotive fluids such as brake fluids, power brake fluids, transmission fluids, power steering fluids, various hydraulic fluids and industrial gear oils and in liquid hydrocarbyl fuels.

In instances where synthetic oils are desired in perference to refined petroleum or mineral oil they may be employed alone or in combination with a mineral oil. They may also be used as the vehicle or base of grease compositions. Typical synthetic lubricants include polyisobutylene, polybutenes, hydrogenated polydecenes, polypropylene glycol, polyethylene glycol, trimethylol propane esters, neopentyl and pentaerythritol esters of carboxylic acids, di(2-ethylhexyl) sebacate, di(2-ethylhexyl) adipate, dibutyl phthalate, fluorocarbons, silicate esters, silanes, ester of phosphorus-containing acids, liquid ureas, ferrocene derivatives, hydrogenated mineral oils, chain-type polyphenols, siloxanes and silicones (polysiloxanes), alkyl-substituted diphenyl ethers typified by a butyl-substituted bis(p-phenoxy phenyl) ether, phenoxy phenylethers, dialkylbenzenes, etc.

As hereinbefore indicated, the aforementioned additives can be incorporated as additives in grease compositions. When high temperature stability is not a requirement of the finished grease, mineral oils having a viscosity of at least 40 SSU at 150° F. are useful. Otherwise those falling within the range of from about 60 SSU to about 6,000 SSU at 100° F. may be employed. The lubricating compositions of the improved greases of the present invention, containing the above-described additives, are combined with a grease forming quantity of a thickening agent. For this purpose, a wide variety of materials can be dispersed in the lubricating oil in grease-forming qualities in such degree as to impart to the resulting grease composition the desired consistency. Exemplary of the thickening agents that may be employed in the grease formulation are metal soaps as well as non-soap thickeners, such as surface-modified clays and silicas, aryl ureas, calcium complexes and similar materials. In general, grease thickeners are employed which do not melt or dissolve when used at the required temperature within a particular environment; however, in all other respects, any material which is normally employed for thickening or gelling oleaginous fluids or forming greases may be used in the present invention.

Generally the lubricants and fuels of the present invention contain an amount of the product effective to improve extreme pressure properties and antiwear and oxidation characteristics. Normally this amount will be about 0.01–20%, preferably about 0.01–10%, of the total weight of the lubricant.

The invention also contemplates the use of other additives in combination with the additive of this invention. Such other additives include, for example, detergents and dispersants of the ash-producing or ashless type, corrosion-inhibiting agents, auxiliary oxidation-inhibiting agents pour point depression agents, auxiliary extreme pressure agents, color stabilizers and anti-foam agents.

The following examples serve to illustrate the present invention, but are not intended as limitations thereon unless otherwise stated.

EXAMPLE 1

Preparation of Ammonium Dithiocarbamate Salt

The triethylammonium salt of N,N-di-dicoco-dithiocarbamic acid was prepared by reacting dicocoamine and carbon disulfide in the presence of triethylamine in hexane.

Dicocoamine (Armeen 2C-Armak), 353 grams, triethylamine, 110 grams and 250 milliliters of n-hexane were charged into a 2-liter reaction flask protected from moisture. To the well-stirred mixture at ambient temperature, carbon disulfide, 90 grams, was added slowly, while keeping the exothermic reaction temperature between 35° and 40° C. After this addition, the reaction mixture was stirred overnight at ambient temperature.

EXAMPLE 2

Thionyl chloride, 60 grams was added dropwise to the triethylammonium salt of the dithiocarbamic acid formed in Example 1, while the exothermic reaction temperature between 40° and 45° C. was maintained. After the addition, the reaction mixture was heated at 65° C. for two hours, cooled and filtered. The filtrate was washed with water, dried over anhydrous magnesium sulfate and stripped to give 409 grams of a brown oil product.

Similar products were prepared by reacting thionyl chloride with the triethyl ammonium salt of the dithiocarbamic acid in which the nitrogen atom is substituted with two 2-ethylhexyl groups and with two n-butyl groups.

EXAMPLE 3

Evaluation of Product

The additives were blended (1%) into solvent refined paraffinic neutral base stocks and tested for effectiveness by Mobil Method M334-2 as an antioxidant and in a standard 4-Ball Test machine for antiwear activity. The conditions of tests, results, and comparison of the products described in Example 2 with the base oil are shown in Tables 1 and 2. Table 3 shows results of an oxidation and corrosion test conducted of a proprietary blend, i.e., a blend containing in addition to the additive of this invention other commercial additives used in manufacturing standard commercial lubricating oils.

The oxidation test reported in Tables 1 and 3 consists basically of bubbling a stream of air through a volume of the lubricant at the rate of about five (5) liters per hour at 325° F. for 40 hours. Present in the composition are samples of metals commonly used in engine construction, namely iron, copper, aluminum and lead. See U.S. Pat. No. 3,682,980, incorporated herein by reference, for further details of the test. Reductions in viscosity index or neutralization number (or both) show effective control.

The Shell 4-Ball Wear Test tests for scarring. In the test, S2100 stainless steel balls of ½-inch diameter were used under a 60 Kg load for 30 minutes, under the test conditions indicated in Table 2.

TABLE 1

| B-10 Catalytic Oxidation Test 325° F., 40 Hrs., Beaumont Stock 350 $[(R)_2NC(S)S-]_2SO$ | | | |
|---|---|---|---|
| Run | Additive (1%) | ΔNN | % ΔKV |
| 1 | None | 17.6 | 142.8 |
| 2 | R = Dodecyl (from dicocoamine) | 1.3 | 8.7 |
| 3 | R = 2-Ethylhexyl | 8.9 | 64.9 |
| 4 | R = n-Butyl | — | 82.8 |

TABLE 2

| 4-Ball Wear Test, 2000 rpm ½" Balls, S2100 Stell, 60 kg, 30 Minutes $[(R)_2NC(S)S-]_2SO$ | | | |
|---|---|---|---|
| Item | Additive (1%) | Wear Scar Diam (mm) 200° F. | 300° F. |
| 1 | None | 2.19 | 2.92 |
| 2 | R = Dodecyl (from dicocoamine) | 0.76 | 0.89 |
| 3 | R = 2-Ethylhexyl | 0.82 | 0.85 |
| 4 | R = n-Butyl | 1.32 | 1.42 |

TABLE 3

| Oxidation and Corrosion Test 400° F., 72 Hours $[(C_{12}H_{25})_2NC(S)2-]_2SO$ | | |
|---|---|---|
| Oxidation & Corrosion | Proprietary Blend 0% Additive | Proprietary Blend Plus 0.25% Additive |
| % ΔKV @ 100° C. | 388 | 11.55 |
| % ΔNN | 12.2 | 1.21 |
| Metals, mg/cm | | |
| Al | 0 | −0.0002 |
| Ag | −0.0003 | +0.0001 |
| Cu | −0.0125 | −0.0017 |
| Steel | −0.0001 | −0.0002 |
| Mg | −0.2164 | −0.0001 |
| Sludge | | |
| Vapor | Medium | Mod |
| Interface | Heavy | Mod |
| Liquid | Heavy | Mod |
| SAE Wear | Fail | Pass |
| 30 Days Storage Stability | | |
| 0° F. | | Pass |
| 70° F. | | Pass |
| 150° F. | | Pass |

I claim:

1. A lubricating composition comprising a major amount of a lubricating oil and between about 0.01 and about 20 percent by weight of the reaction product obtained by reacting thionyl chloride, $SOCl_2$, with an amine or metal dithiocarbamate salt having the following structural formula:

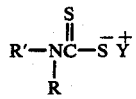

where R and R' are the same or different, each being
(a) a hydrocarbyl group containing from 1 to 36 carbon atoms, having none or at least one heteroatom which can be oxygen, sulfur, or nitrogen and selected from the group consisting of alkyl, alkenyl, aryl, aralkyl, alkaryl radicals containing zero, one, or more than one phenyl, naphthyl, or anthryl substituent, or
(b) part of an $(CH_n)_m$ radical with R and R' comprising part of an alicyclic or heterocyclic system selected from the group consisting of pyrrole, pyrrolidine, piperidine and morpholine where n is 1 or 2 and m is 2 to 8, and Y is an ammonium or metal radical.

2. The lubricating composition of claim 1 wherein the reactants are reacted in a molar ratio of about 1 mole of thionyl chloride to about 2 moles of dithiocarbamate salt at a reaction temperature of about 0° C. to about 120° C. and at a pressure of about 0 psig to about 100 psig.

3. The lubricating composition of claim 1 wherein the dithiocarbamate salt is the triethylammonium salt of N,N-didodecyldithiocarbamic acid.

4. The lubricating composition of claim 1 wherein the dithiocarbamate salt is the salt of a dithiocarbamic acid selected from the group consisting of N,N-di-2-ethylhexyldithiocarbamic acid and N,N-di-n-butyldithiocarbamic acid.

5. The lubricating composition of claim 1 wherein R and R' each contains between about 1 and about 36 carbon atoms.

6. The lubricating composition of claim 1 wherein the lubricating oil is selected from the group consisting of mineral oil, synthetic oil, mixtures thereof, and greases.

7. A method of making a lubricating composition comprising adding to a lubricating oil the reaction product obtained by reacting thionyl chloride, $SOCl_2$, with an amine or metal dithiocarbamate salt having the following structural formula:

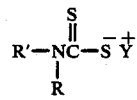

where R and R' are the same or different, each being
(a) a hydrocarbyl group containing from 1 to 36 carbon atoms, having none or at least one heteroatom which can be oxygen, sulfur, or nitrogen and selected from the group consisting of alkyl, alkenyl, aryl, aralkyl, alkaryl radicals containing zero, one, or more than one phenyl, naphthyl, or anthryl substituent, or
(b) part of an $(CH_n)_m$ radical with R and R' comprising part of an alicyclic or heterocyclic system selected from the group consisting of pyrrole, pyrrolidine, piperidine and morpholine when n is 1 or 2 and m is 2 to 8, and Y is an ammonium or metal radical.

8. The method of claim 7 wherein the reactants are reacted in a molar ratio of about 1 mole of thionyl chloride to about 2 moles of dithiocarbamate salt at a reaction temperature of about 0° C. to about 120° C. and at a pressure of about 0 psig to about 100 psig.

9. The method of claim 7 wherein the dithiocarbamate salt is the triethylammonium salt of N,N-didodecyldithiocarbamic acid.

10. The method of claim 7 wherein the dithiocarbamate salt is the salt of a dithiocarbamic acid selected from the group consisting of N,N-di-2-ethylhexyldithiocarbamic acid and N,N-di-n-butyldithiocarbamic acid.

11. The method of claim 7 wherein R and R' each contains between about 1 and about 36 carbon atoms.

* * * * *